United States Patent [19]

Piuma

[11] Patent Number: 4,637,920
[45] Date of Patent: Jan. 20, 1987

[54] PROCESS FOR THE SEPARATION OF METAL COMPOUNDS BY REDUCTION

[75] Inventor: Adolfo Piuma, Spigno Monferrato, Italy

[73] Assignee: VA.NI.M S.r.l, Novara, Italy

[21] Appl. No.: 734,040

[22] Filed: May 14, 1985

[30] Foreign Application Priority Data

Jun. 13, 1984 [IT] Italy ............................... 12539 A/84

[51] Int. Cl.$^4$ ............................................. C01G 31/02
[52] U.S. Cl. ....................................... 423/67; 423/145; 423/155; 423/592
[58] Field of Search ................. 423/67, 592, 145, 155; 75/109

[56] References Cited

U.S. PATENT DOCUMENTS 3,752,759  8/1973  Burg et al. ............................ 75/109
4,389,378  6/1983  McCorriston ........................ 423/67

Primary Examiner—Melvyn J. Andrews
Attorney, Agent, or Firm—Robert E. Burns; Emmanuel J. Lobato; Bruce L. Adams

[57] ABSTRACT

The object of this invention is a process for separating metal compounds, even in small percentages, from dusts and sludges, by reduction.

The process may be successfully applied to the selective separation of vanadium pentoxide contained in small fractions in the ashes of heavy fuels, as well as to the separation and/or passivation of chromium compounds, of which the polluting characteristics are well-known.

Separation is obtained by means of a reduction tower containing preferably iron scraps or shavings, adjusting on one side the pH of the input solutions according to their compositions, and on the other side the speed with which the solution passes through the reduction tower, so as to obtain a specific pH value of the output, again depending on the type of metal to be treated (FIG. 2).

5 Claims, 2 Drawing Figures

PROCESS FOR THE SEPARATION OF METAL COMPOUNDS BY REDUCTION

BACKGROUND OF THE INVENTION

The object of this invention consists of a process for separating metal compounds, even in small percentages, from dusts and sludges, by reduction.

This process is particularly suitable for separating vanadium pentoxide from the ashes derived from the combustion of heavy fuels, to obtain very pure vanadium at an extremely low cost.

The reduction process may be equally well applied to the separation or passivation of hexavalent chromium compounds, which are highly polluting substances, and which, if present in relatively high percentages, may be recovered, or, if present only in limited percentages in the material to be treated, may be reduced to trivalent chromium by the same reduction process, and then passivized to transform them into compounds insoluble in water.

It is known that vanadium is a metal present in many metal alloys, and in the form of vanadium pentoxide it is widely used as a catalyst, in the place of the more expensive platinum sponge.

Vanadium is present in most crude oils, in a few tens of parts per million, varying considerably according to the origin of the crude oil.

Vanadium is therefore present in general in the ashes derived from the combustion of the heavier crude oil fractions. Extraction of vanadium from these ashes by traditional methods generally does not pay, in view of its low percentage; in addition, this vanadium is always accompanied by other metals from which it has to be separated by a second stage, making the production costs even higher.

As per Canadian Pat. No. 752.773, the vanadium present in the ashes obtained from the combustion of the heavier fractions of crude oil is separated as follows:

Diluted sulphuric acid is added to the dust obtained from the ashes of heavy fuel, so as to obtain vanadium sulphate, nickel sulphate, magnesium sulphate and calcium sulphate; after 2 to 3 hours the reaction has ended, and then hot water is added so as to dissolve all the sulphates into a solution.

This first stage of the process is common to all the processes, including the process on which this invention is based. The solid fraction is separated by filtering, and using suitable methods the washing water is separated from the concentrated solution of sulphates, to be called hereinafter the "filtrate".

As per the above-mentioned Canadian patent, the filtrate thus obtained, consisting of a concentrated solution, is oxidized, to transform all the vanadium into pentavalent vanadium.

Oxidation is preferably carried out in a diluted water solution, using sodium chlorate, potassium chlorate or hydrogen peroxide as the oxidizer.

Sodium chlorate is preferable as the oxidizing agent, being readily available on the market and being less expensive than potassium chlorate or hydrogen peroxide.

Oxidation is best carried out at a temperature of about 150° F. (about 66° C.), although the reaction can take place, more slowly, even at lower temperatures. At temperatures higher than the above there is a loss of the oxidizing agent (oxygen) caused by the excessive development of chlorine gas.

During oxidation the pH of the said solution need not be an exact value, but may vary within a certain range. When the oxidation process is complete, the colour of the solution turns from blue to green or yellow.

Once oxidation has been completed, the solution is submitted to another chemical treatment. This latter treatment consists of the precipiatation of the vanadium from the solution by adding a suitable reagent, for example ammonia, preferably anhydrous. Precipitation is effected at a temperature between 180° F. (82.22° C.) and 200° F. (93.33° C.) and at a pH between 1.7 and 2.1.

Experts in this field know that the vanadium pentoxide may be precipitated at various temperatures, but due to the nature of the chemical reaction involved, it is preferable to operate as close as possible to the boiling point of the solution. The higher the temperature, the greater the result and the shorter the time required to achieve complete precipitation. As far as concerns the best pH, at a low pH level the vanadium outturn is lower, while with a pH of about 2, the iron present in the solution may precipitate in considerable quantities, which is not desirable. In addition, with a high pH the process requires excessive amounts of chemical reagents, and consequently entails higher costs. In any case, according to Canadian Pat. No. 752.773, the transformation of the vanadium into vanadium pentoxide is made critical by the danger of precipitating the iron in the solution. If this occurs, it is necessary to recycle the product just obtained.

BRIEF SUMMARY OF THE INVENTION

The process claimed differs from all the known processes having the same scope in that the transformation of the vanadium into vanadium pentoxide is achieved not by oxidation but by reduction, contrary to the methods generally employed at the present known state of the art in general and under the above mentioned Canadian patent in particular. The process claimed may be applied to the treatment of other metal salts, such as chromium, using the same reduction method.

BRIEF DESCRIPTION OF DRAWINGS

The essential characteristics of the invention are summarized and schematically explained in the claims; the objects and advantages of said invention will also result from the description given below of forms of implementation, chosen by way of example only, with particular reference to the attached drawings, of which:

DETAILED DESCRIPTION OF THE PREFERRED EMBODIMENT

Figure 1:
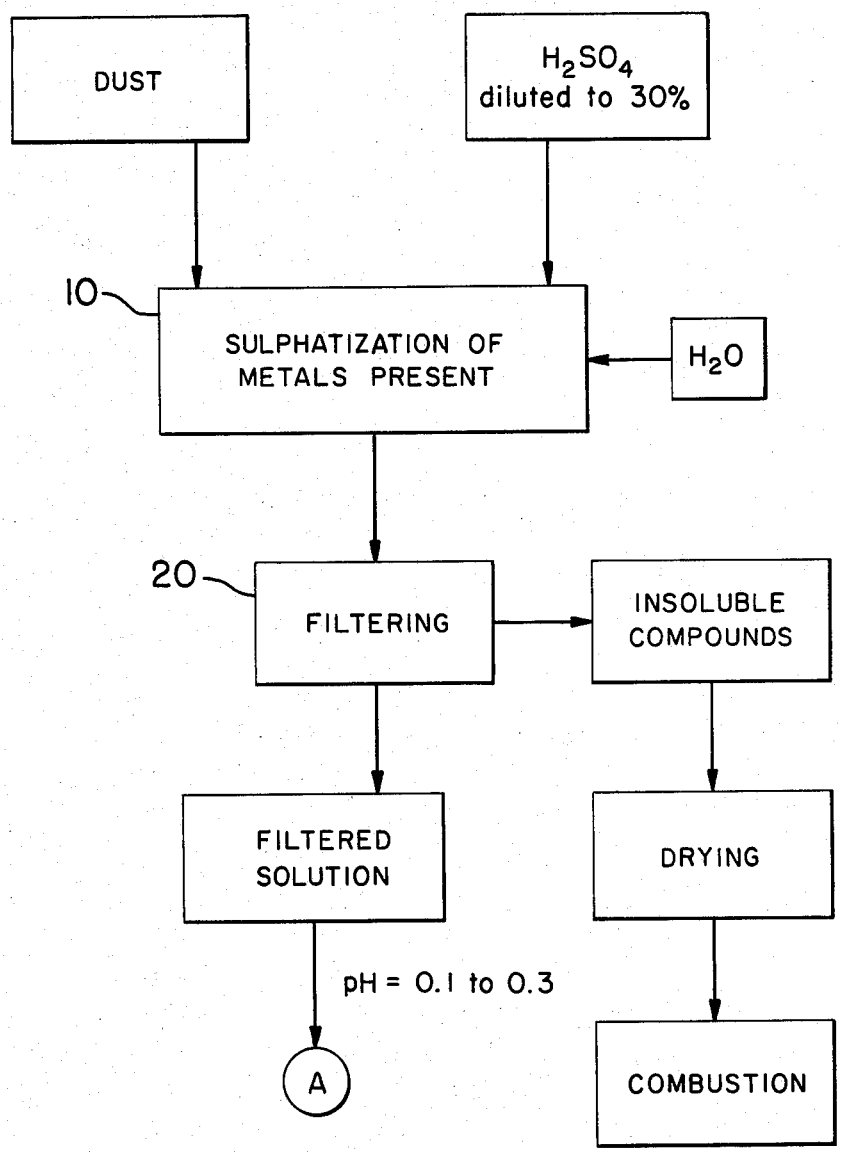
FIG. 1 is a block diagram of the first phase of the process, in common with the known technical knowledge, and referred to the treatment of vanadium compounds.

With particular reference to FIG. 1, the first phase of the process is put into practice as follows:

The starting material consists of dust of unburnt matter originating for example from the electrostatic precipitators of thermal power plants which utilize fuel containing vanadium.

A dust sample obtained by mixing dusts from twenty power stations was found to have the following physical-chemical characteristics:

| (a) Physical characteristics: | |
|---|---|
| dry specific weight | 280 kg/m$^3$ |
| specific weight after mixing with about 25-30% of water | 850 kg/m$^3$ |
| particle size analysis: | |
| +100 mesh | 1.633% |
| +120 mesh | 2.000% |
| +140 mesh | 8.362% |
| +170 mesh | 8.593% |
| +200 mesh | 14.311% |
| +230 mesh | 9.232% |
| +270 mesh | 9.410% |
| +325 mesh | 12.784% |
| +400 mesh | 6.125% |
| 400 mesh | 27.539% |

| (b) Chemical characteristics (weighted percentages): | |
|---|---|
| Chemical compounds | Percentage in weight |
| Vanadium pentoxide ($V_2O_5$) | 6.12% |
| Nickel oxide (NiO) | 2.63% |
| Iron oxide ($Fe_2O_3$) | 1.53% |
| Magnesium oxide (MgO) | 6.50% |
| Silicon dioxide ($SiO_2$) | 1.00% |
| Calcium oxide (CaO) | 0.53% |
| Carbon (C) | 62.00% |
| Sulphur dioxide ($SO_2$) | 15.00% |

Sulphuric acid diluted to 30% is added to a powder of this type at stage 10 of FIG. 1, so as to produce:
vanadium sulphate
nickel sulphate
magnesium sulphate
iron sulphate
calcium sulphate After about two hours, the sulphatization reaction has terminated, and hot water may be added in order to form a solution with the sulphates produced, which are all easily soluble, with the exception of the calcium sulphate, as shown in the following table.

| COMPOUND | SOLUBILITY IN GR. PER 100 CM$^3$ | |
|---|---|---|
| | Cold water | Hot water |
| Vanadium sulphate | 99.85 | 99.90 |
| Nickel sulphate | 29.30 | 87.70 |
| Magnesium sulphate | 71 | 91 |
| Iron sulphate | 100 | 100 |
| Calcium sulphate | 0.209 | 0.1619 |
| Silicon oxide | Insoluble | Insoluble |

The sulphatization stage indicated by block 10 in FIG. 1 is followed by a filtering operation, after which the insoluble compounds are separated from the soluble compounds dissolved in the solution. Among the insoluble compounds it is important to remember the unburnt fractions of carbon dust.

The insoluble fraction separated during filtering has the following weighted composition:

| | |
|---|---|
| water | 35% |
| carbon | 64.35% |
| calcium oxide | 0.195% |
| silicon dioxide ($SiO_2$) | 0.32% |
| various oxides | 0.097% |

These insoluble compounds are dried using the fumes of a boiler, and then fed back into its own burner so as to produce steam which will be utilized in a subsequent stage of the process.

The filtered solution leaving filter 20, and which contains vanadium, nickel, iron and magnesium, has a pH of about 0.1-0.3.

This filtered solution would have been submitted, as per the previously known processes, to oxidation and then to precipitation.

Figure 2:
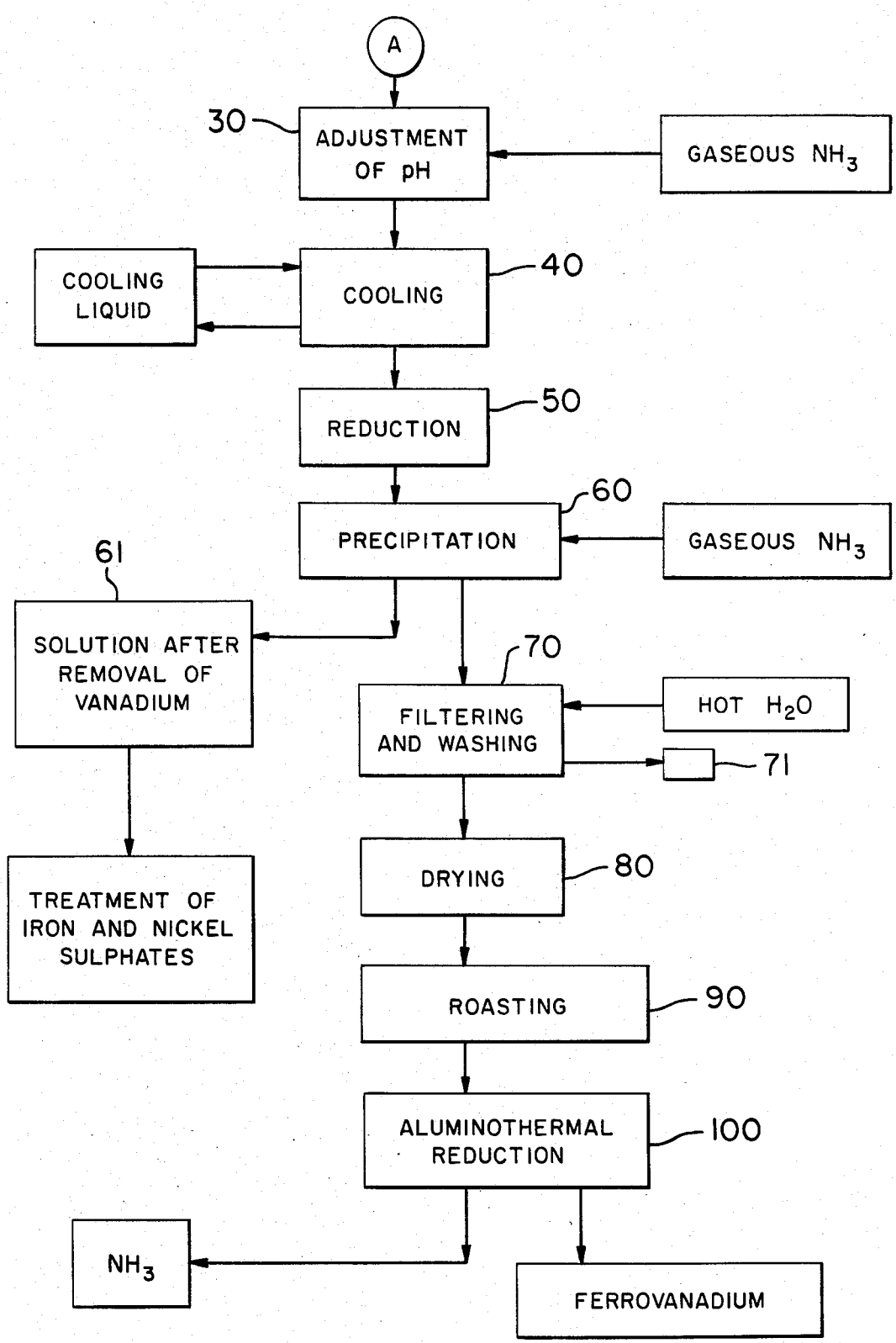
FIG. 2 illustrates a second phase of the process which is the object of this invention, once again referred to the treatment of vanadium compounds.

According to this invention (see FIG. 2), the filtered solution is instead pumped into a tank, 30, equipped with an agitator (not shown) and a pH-meter, into which gaseous ammonia is also added until the filtered solution reaches a pH of 1. The purpose of the pH-meter is therefore to control the input of gaseous ammonia until the required pH is reached. The increase of the pH from 0.1-0.3 (initial value) up to 1 (end value) causes the filtered solution to heat up to a temperature of about 60° C. A heat exchanger, 40, with water as the cooling liquid, is used to return the filtered solution to room temperature.

The filtered solution, with a pH of 1, and at a temperature of about 25° C., is fed into the top of a reduction column, 50, containing iron scraps.

The liquid coming out of the reduction column, 50, has changed colour from green to blue, and is pH is now about 1.5-2.0.

The pH of the liquid coming out of the bottom of the column is checked by a pH-meter connected to a controlled valve which adjusts the flow of liquid entering the reduction column.

The next phase of the process occurs inside one or more reactors, 60, in cascade formation, into which gaseous ammonia is fed until the pH of the solution has reached a value of about 5.8-5.9. When the pH of the solution reaches this level, practically all the vanadium has precipitated in the form of ammonium polyvanadate, while the nickel, iron and magnesium sulphates remain in solution.

The precipitate (ammonium polyvanadate) is filtered and washed in 70, with the addition of hot water in order to make sure that all the nickel and iron left in solution in the imbibition water of the precipitate have been eliminated from the filtrate; the washing water is sent to a storage tank, 71. The filtered and washed precipitate (ammonium polyvanadate) is dried in a hot air dryer, 80, and from here conveyed to a roasting oven (90).

During roasting, the ammonium radical is replaced by oxygen to form vanadium pentoxide ($V_2O_5$).

If required, it is possible to transform the vanadium pentoxide into ferrovanadium by aluminothermal reduction in an electric oven, while the ammonia which forms in the roasting oven is removed by a fan and conveyed to the storage tank for the washing water used in the various phases of the process. The free ammonia contained in this solution is recovered by stripping; the remaining part of the solution containing ammonia bonded in the form of ammonium sulphate is sent to an evaporator and crystallizer bank.

As far as concerns the solution, 61, from the ammonium polyvanadate precipitation stage, 60, this still contains prevalently iron and nickel sulphates, which may be recovered separately. For this purpose, the solution, 61, is decanted into a tank (not shown in detail) in which the ammonium polyvanadate fractions still present precipitate in a period of time ranging from about 12 to 16 hours.

The solution, purified of the ammonium polyvanadate, is conveyed to a tank in which gaseous ammonia is added until a pH of 10–10.5 is reached, and then hydrogen peroxide, so that the bivalent iron becomes trivalent.

At this pH level, all the iron precipitates as ferric hydroxide ($Fe(OH)_3$), while the nickel is certainly in the form of an ammoniacal complex (nickelammonium), and remains in solution.

The iron hydrate may be filtered with a press-filter, washed with hot water, and then disposed of to aluminate cement manufacturers.

The filtered solution, which now contains only nickel in the form of an ammonium complex, is fed to a series of cascade-connected reactors, through which the hydrogen sulphide ($H_2S$) is bubbled in the opposite direction so as to produce nickel sulphide which precipitates and is then filtered, in turn, on a press-filter.

The nickel sulphide, washed with hot water and dried, is fed to a roasting oven to form nickel oxide (NiO). Once it has cooled, this may be stored in drums, while the sulphur dioxide which forms during the nickel sulphide roasting process is collected with a fan and bubbled into the dust attacking tank into which the diluted sulphuric acid is already being fed.

The process described above may be applied, as well to the dust removed from power station fume filters, also to the ashes which collect at the bottom of the boilers in the same power stations.

In this latter case, the ashes are attacked using sulphuric acid at a concentration of 95–98%, instead of diluted sulphuric acid. Hot water may be added after a few hours of acid attack, after which no significant changes in the phases already described are required.

It should be pointed out that by replacing the oxidation phase recommended by the known method with the reduction phase, as per this invention, it is possible to separate first the vanadium, then the iron, and lastly the nickel, in separate, successive stages.

What I claim is:

1. A process for the separation of vanadium and for the production of vanadium pentoxide from material selected from dust, sediment and ashes containing vanadium compounds and originating from the combustion of heavy fuels containing vanadium, in which the material is treated initially with sulfuric acid and then the resultant solution is filtered to separate the insoluble compounds from soluble sulfates comprising:

adding ammonia to the filtered solution until a pH of about 1.0 is reached, cooling the solution to a temperature of about 25° C., passing the solution through a reduction column containing iron scraps to provide vanadium compounds wherein the valence of the vanadium is less than 5, the flow of liquid entering the reduction being adjusted so that the pH of the solution exiting from the bottom of the column is about 1.5 to 2.0, and adding gaseous ammonia to the solution coming from the reduction column until the pH reaches a value of 5.5 to 6.5 whereby the vanadium precipitates in the form of insoluble compounds.

2. The process of claim 1 in which gaseous ammonia is added to the solution coming from the reduction column until the pH reaches a value of 5.8–5.9.

3. The process according to claim 1 in which the dust, sediment and ashes also contain iron, nickel and magnesium which are transformed into sulfates by the treatment with sulfuric acid and in which the sulfates of iron, nickel and magnesium remain in solution when gaseous ammonia is added to the solution coming from the reduction column, and only insoluble vanadium compounds are precipitated by the addition of gaseous ammonia.

4. The process according to claim 1 in which the dust, sediment and ashes also contain iron which remains in solution as iron sulfate when gaseous ammonia is added to the solution coming from the reduction column and the further step of adding gaseous ammonia to the solution from which insoluble vanadium compounds have been separated by filtration until a pH between 9.1 and 12.0 is attained, so that the iron is precipitated in the form of insoluble ferric hydroxide.

5. The process according to claim 1 in which the dust sediment and ashes also contain iron which remains in solution as iron sulfate when gaseous ammonia is added to the solution coming from the reduction column and the further step comprising adding gaseous ammonia to the solution from which insoluble vanadium compounds have been separated by filtration until a pH of 10.0 to 10.5 is attained so that the iron is precipitated in the form of insoluble ferric hydroxide.

* * * * *